United States Patent [19]

Hehl

[11] Patent Number: 5,622,737
[45] Date of Patent: Apr. 22, 1997

[54] MOLD CLOSING UNIT FOR USE IN AN INJECTION MOLDING MACHINE AND PROCESS FOR CONTROLLING IT

[76] Inventor: Karl Hehl, Arthur-Hehl-Str. 32, D-72290 Lossburg, Germany

[21] Appl. No.: 415,097

[22] Filed: Mar. 31, 1995

[30] Foreign Application Priority Data

Apr. 2, 1994 [DE] Germany ............... 44 11 649.7
Apr. 2, 1994 [DE] Germany ............... 44 11 650.0

[51] Int. Cl.⁶ ............................................. B29C 45/66
[52] U.S. Cl. ................. 425/590; 425/451.2; 425/451.4; 425/451.7; 425/589
[58] Field of Search ............................ 425/589, 590, 425/595, 450.1, 451.2, 451.4, 451.7, 451.9

[56] References Cited

U.S. PATENT DOCUMENTS

| | | | |
|---|---|---|---|
| 2,363,107 | 11/1944 | Young | 425/451.4 |
| 3,247,545 | 4/1966 | Sullivan | 425/451.4 |
| 3,712,774 | 1/1973 | Parker | 425/154 |
| 4,377,377 | 3/1983 | Arends et al. | 425/451.4 |
| 4,797,086 | 1/1989 | Adachi | 425/589 |
| 4,849,151 | 7/1989 | Tamura et al. | 425/589 |
| 4,865,536 | 9/1989 | Inaba et al. | 425/589 |
| 4,906,173 | 3/1990 | Inaba et al. | 425/451.4 |
| 5,104,308 | 4/1992 | Morton et al. | 425/451.2 |
| 5,322,430 | 6/1994 | Kasai et al. | 425/589 |
| 5,338,174 | 8/1994 | Miese et al. | 425/589 |

FOREIGN PATENT DOCUMENTS

| | | |
|---|---|---|
| 0096183 | 9/1985 | European Pat. Off. . |
| 02715888 | 9/1991 | European Pat. Off. . |
| 1493473 | 9/1967 | France . |
| 2022191 | 7/1971 | Germany . |
| 4345034 | 10/1994 | Germany . |
| 4-39007 | 2/1992 | Japan ............... 425/451.4 |
| 1184909 | 3/1970 | United Kingdom . |
| 1193405 | 6/1970 | United Kingdom . |
| 92/11993 | 7/1992 | WIPO . |
| 94/22655 | 10/1994 | WIPO . |

OTHER PUBLICATIONS

Patent Abstracts of Japan, vol. 9, No. 152 (M–391), Jun. 27, 1985 & JP–A–60–030321.
Patent Abstracts of Japan, vol. 13, No. 335 (M–856), Jul. 27, 1989 & JP–A–01–113220.
Patent Abstracts of Japan, M–618 Aug. 21, 1987, vol. 11, No. 258 & JP A–62–64520, Mar. 23, 1987.

*Primary Examiner*—James P. Mackey
*Attorney, Agent, or Firm*—Spencer & Frank

[57] ABSTRACT

A mold closing unit for use in an injection molding machine for processing plastifiable materials, including a first device for transferring a movable mold carrier, and a second device for generating the closing force. The first device is supported at a first supporting element. The second device acts on the first device, the first supporting element and the movable mold carrier. The second device for generating the closing force is an eccentric drive or a hydraulic drive units which enables a process for force control.

6 Claims, 9 Drawing Sheets

$\Delta s = f(\Delta \alpha)$
$\Delta s = e - e \times \cos\Delta\alpha$
$F4 = f \times \Delta s$

FIG.10

MOLD CLOSING UNIT FOR USE IN AN INJECTION MOLDING MACHINE AND PROCESS FOR CONTROLLING IT

BACKGROUND OF THE INVENTION

1. Field of the Invention

This application relates to a mold closing unit for use in an injection molding machine comprising a stationary mold carrier, a movable mold carrier constituting a mold clamping space together with the stationary mold carrier between the movable mold carrier and the stationary mold carrier, a mold comprising at least two parts mounted on the stationary mold carrier and the movable mold carrier, a first device adapted to transfer the movable mold carrier into and out of a closing position with the stationary mold carrier for closing the parts of the mold within the mold clamping space, a first supporting element for supporting at least the first device connected with the stationary mold carrier by force transmitting means, a second device for generating a closing force engagable after the first device during mold closure of the mold and acting on the first device, the first supporting element and the movable mold carrier.

This application relates furthermore to a process for controlling such a mold closing unit with at least one first force sensing means for sensing an actual force occurring in moving the movable mold carrier and in generating the closing force and adapted to sense the actual force only at a time before the second device is actuated, the process comprising the steps of:

setting of a first maximum force limiting the actual force occurring in moving the movable mold carrier from a start position into the closing position, setting of a touch force to be generated by the first device when the at least two parts of the molds are in the closing position, sensing the actual force occurring in moving the movable mold carrier and in generating the closing force via the first force sensing means, comparing the actual force with the first maximum force and stopping the moving of the movable mold carrier when the actual force is higher than the first maximum force.

This application relates also to a process for controlling such a mold closing unit wherein the second device for generating the closing force is an eccentric drive, a shaft of which is adapted to generate the closing force on the first device, and comprising at least one second force sensing means for sensing an actual force occurring in moving the movable mold carrier and in generating the closing force, wherein the process comprises the steps of:

setting of a touch force to be generated by the first device when the at least two parts of the molds are in the closing position, setting of a maximum closing force, calculating a partial force to be generated by the eccentric drive in subtracting the touch force from the maximum closing force, setting of a control area, wherein the eccentric drive is controllable within the control area to maintain the closing force; the control area is terminated by a dead stop, where the eccentric drive is at least nearly stretched, calculating a way of deformation arising in generating the partial force by the eccentric drive after the touch force was generated by the first device and adding a way corresponding to the control area, calculating a remainder angle necessary for generating the way of deformation and the way corresponding to the control area when turning the eccentric drive into the dead stop, calculating a supplementary angle amending the remainder angle to 180 degree, driving the eccentric drive to set the supplementary angle measured from a zero position, wherein the eccentric drive has a smallest length, carrying out at least one cycle comprising the steps:

closing the at least two parts of the mold and generating the touch force via the first device, generating the closing force via the eccentric drive in turning the eccentric shaft to generate the partial force, injecting of the plastifiable materials to produce a molding, sensing the actual force via the second force sensing means and comparing the actual force with the maximum closing force to establish a set value for the eccentric drive, controlling the eccentric drive within the control area via the set value at least during injection, turning back the eccentric drive around the remainder angle, removing the touch force and opening the mold via the first device to remove the molding from the mold.

2. Description of the Prior Art

A mold closing unit of this kind is known from JP-A 62-64520. In this device the movements arising during the mold closure are assigned to different subassemblies. A first subassembly is a toggle mechanism driven via a ball screw. The main function of the toggle mechanism is to transfer the movable mold carrier into and out of a closing position with the stationary mold carrier. After approaching the two parts of a mold, however, there still remains a split. The rest of the movement is effected by a second device engaging at a screw bushing, which at the same time is the bearing of the ball screw. The first step of the movement, that is, until the mold is closed, is effected by this mechanism by applying high speed and a low moment of torsion. For the purpose of concluding the mold closure definitely the second device has to be used. Thereupon the second device switches over to an operating method with a high moment of torsion, so that the closing force can be brought up by the second device and interconnection of the first device. Since the individual tasks are not assigned clearly to the two devices, costly gearings and change-over steps are necessary, even if a supporting element for the first device is movably supported, so that the whole unit can be supported at the supporting element for the second device.

In a mold closing unit according to International Published Application WO 92/11993 the movements necessary for the mold closure in an injection molding machine are distributed on two subassemblies, which are actuable consecutively in two steps. A spindle drive is used for displacing the movable mold carrier, whereas a hydraulic cylinder is provided for generating the closing force. The threaded spindle is movably supported in the plunger piston of the hydraulic cylinder. Both elements are supported at a common supporting element. When the threaded spindle is actuated, it is maintained in a zero-position by spring means, so that a resilient suspension of the threaded spindle is created, which might cause difficulties when the closing force is brought up. During the generating of the closing force the threaded spindle—in case it is not irreversible—has to be kept in contact by its drive motor to avoid a reversed rotation. At the same time the threaded spindle serves as closing force transmitter and closing force generator.

A further mold closing unit of this kind is disclosed in European Patent 271 588. In this unit two spindle systems are connected in series. The spindle systems are actuated consecutively, wherein couplings are provided adapted to isolate the respective not used spindle from the power flux. The double expenditure of the spindle bearing with respect to the full closing force should not be underestimated. For fixing the spindle it is also possible to provide braking means or claw couplings, which spring is adjusted in a way that a reaction force realizes the coupling during the mold closure.

In Published German Patent Application P 43 45 034 and the counterpart International Published Patent Application WO 94/22655 a process for the control of an electrical driven injection molding machine is described. To realize a reliable control of the forces occurring in moving the movable mold carrier, the sole use of a toggle lever mechanism for mold closure is suggested. The toggle lever mechanism is driven via a servo motor and the force is determined during the closing cycle, for example; in sensing the current of the motor necessary for moving the movable mold carrier or at the joint of the toggle lever. The hereby determined value is compared with a desired curve and watched. However, because only one drive generates the complete mold closure, the force sensor must be able to sense all the forces occurring at the machine from zero to the maximum closing force. A sensitive control of the closing movement is therefore not possible. A control of the generated mold closing force, after the mold is closed is neither intended nor possible. However, such a control can only be realized with a large amount of energy, because the toggle lever mechanism can only work economical in its most stretched position.

SUMMARY OF THE INVENTION

It is an object of the invention to provide a mold closing unit for use in an injection molding machine for processing plastifiable materials in that a reliable force transmission is made possible in the most reasonable manner.

That object is accomplished in accordance with the invention, in that the second device for generating the closing force is an eccentric drive, a shaft of which is adapted to generate the closing force on the first device or in that the second device for generating the closing force is a hydraulic drive unit, a piston of which pressurizes the first device. In particular, the mold closing unit includes a stationary mold carrier, and a movable mold carrier that forms with the stationary mold carrier a mold clamping space located therebetween. A mold is provided. The mold comprises at least two parts each being respectively mounted on the stationary mold carrier and the movable mold carrier. First and second supporting elements are provided. A force transmitting device connects the first and second supporting elements to the stationary mold carrier. A transfer device is supported by the first supporting element and is connected to the movable mold carrier for transferring the movable mold carrier at least nearly into and out of a closing position with the stationary mold carrier. The closing position is a position in which the at least two parts are essentially closed. An eccentric drive is supported by the second supporting element and connects the second supporting element to the first supporting element. The eccentric drive has a shaft that exerts a closing force that is transmitted through the first supporting element, the transfer device, and the movable mold carrier. The eccentric drive is actuated to exert the closing force after the transfer device has transferred the movable mold carrier into the closing position.

In such an arrangement the movements and forces to be brought up are specifically assigned to individual subassemblies. The first device, preferably a spindle system, serves for transferring the movable mold carrier, whereas a second device is adapted to bring up the necessary movement after the parts of the mold have been closed and generates the closing force. During the process of generating the closing force, the whole first device together with the movable mold carrier is pressurized by the second device and merely serves as a closing force transmitter. Due to the clearly classified force distribution it is also possible to exactly adjust the drive motors as to their respective function, so that in the first device cost-saving, small drive motors can be used. A preferred unit for generating the closing force is an eccentric drive, which is easily controllable on the necessary short distances. By this it is possible in a most easy way to generate the exact closing force if the first device for moving the movable mold carrier is electromechanically driven as well as if it is hydraulically driven. It is no problem to use hybrid drives in such an arrangement.

DETAILED DESCRIPTION OF THE PREFERRED EMBODIMENTS

The invention will now be described in more detail by example with reference to the embodiments shown in the figures. It should be kept in mind that the following described embodiments are only presented by way of example and should not necessarily be construed as limiting the inventive concept to any particular physical configuration.

The mold closing unit is part of an injection molding machine for processing plastifiable materials like synthetic materials, powdery masses as, for example, ceramic masses and the like. The mold closing unit is provided with a stationary mold carrier 12 and a movable mold carrier 11, which between them constitute a mold clamping space S for reception of a mold 33. The mold 33 consists of at least two parts, each part being mounted on the movable mold carrier 11 and the stationary mold carrier 12, respectively. The movement for transferring the movable mold carrier 11 into and out of a closing position with the stationary mold carrier 12 is effected via a first (transfer) device 10 along guidances 45. A second device, 30 is provided for generating the closing force. The second device is actuated after the first device during the mold closure and especially serves for generating the closing force for closing the parts of the mold 33. The first device 10 is supported at a first supporting element 13, which is in connection with the stationary mold carrier by force transmitting means 25. Thus a clear distribution of tasks is made possible, so that the drives can be dimensioned according to their respective function (transferring the movable mold carrier or generating the closing force).

A second supporting element 31 for supporting the second device, 30 for generating the closing force is provided behind the first supporting element 13 in closing direction s—s and seen from the first device 10 for transferring the movable mold carrier 11. If this second device, 30 is actuated, it engages or pressurizes the first device 10, the first supporting element 13 and the movable mold carrier 11 in their entirety as a closing force transmitter. The closing force, however, is only generated by the second device, 30.

The power flux starts from the movable mold carrier 11 and runs initially to the first device 10 and then to the first supporting element 13, which is connected with the second supporting element 31 via transmission elements. The first supporting element 13 and the movable mold carrier 11 are also movably held at the force transmitting means 25. From the second supporting element 31, the power flux continues to the force transmitting means 25, which in the present embodiment are spars, and to the stationary mold carrier 12. Instead of the spars, other elements can be provided as force transmitting means 25, which lead the closing force around the mold clamping space S. It is also possible to use the machine base 26 as the force transmitting means. The whole mold closing unit is only connected with the machine base 26 at the stationary mold carrier 12 by fixing means 36.

In the embodiment shown in the FIGS. 1–4 an electromechanically driven eccentric drive E is used as second device 30 for generating the closing force. According to the FIGS. 3 and 4, the eccentric drive E is driven by a drive motor 40 via a belt 41, which actuates a pulley 42 arranged centrically with respect to an eccentric shaft 34. The eccentric shaft 34 is supported at the second supporting element 31. When the second device 30 is actuated, the eccentric bearing 44, at which a bracket 35 is arranged as a transmitting element, moves into closing direction s—s. The bracket 35 itself is connected with a fitting strip 13c of the first supporting element 13 by a hinge bolt 39. The necessary short deformation distance, originated by the deformation of the whole mold closing unit, for generating the closing force when the mold 33 is in the closed position can thus easily be generated by the eccentric drive.

The first device is an electromechanically driven spindle mechanism. In the present embodiment, two spindles 16 are preferably used for this purpose, since the high reversed rotation moments that occur when the mold is kept closed are partially compensated for and thus the guiding systems are stressed less. Alternatively it is also possible to provide a threaded spindle or a ball screw. The spindle 16 cooperates with a nut 14, preferably a ball nut, which is supported in the mold closing unit by a resting element 37. The resting element 37 is connected with the movable mold carrier 11 via tension rods 38. The tension rods 38 clamp tubes 46 between the resting element 37 and the movable mold carrier 11. This creates a stiff and easily guidable motion unit 47, for example by four guiding elements. This increases the guiding precision, especially due to the distance measured in the closing direction between the movable mold carrier 11 and the resting element 37. This distance depends on the length of the spindle, so that if larger machines are used, the length of the motion unit 47 and consequently the support is also improved. Besides, this factor contributes to increase the precision of the whole mold closing unit. The length of the motion unit 47 is determined by the tubes 46, which receive the spindle 16, and thus by the length of the spindle. The spindles 16 are driven by a drive motor 15 on which motor shaft 15a two belts 22, 23 are driven which set running two pulleys 20,21. Alternatively, to avoid the noise of the driven belts a transmission gear may be used, thereby also reducing the length of the mold closing unit.

The blocking means 17 are provided to avoid a reversed rotation of the spindle 16, when the closing force is generated. The blocking means 17 comprise a blocking disc 17a, which is shrinked on the axis 16a of the spindle 16 by shrinking means 43. The spindle 16 is supporting by bearings 50 and is movable against the force of the resilient first resetting means 18 in a longitudinal direction of the spindle. When the closing force is generated, the blocking disc 17a comes in contact with the first supporting element 13. The blocking disc 17a is provided with a surrounding ring 17b that extends in the longitudinal direction of the spindle 16, which during blocking comes into frictional connection with a ring-shaped projecting part 19a of a bearing ring 19, mounted in the opposite direction. If necessary, the ring 17b and the ring-shaped projecting part 19a for building-up a form-fit connection can also be used in dented execution. The bearing ring 19 is connected with the fitting strip 13c by studs 32. The bearing of the axis 16a is placed between these two elements. In the present embodiment, the blocking disc 17a is at the same time the hub of the pulleys 20,21.

Basically the operation is as follows: Initially the mold 33 is closed by the spindle 16. As soon as the parts of the mold 33 come in contact, the distance b is adjusted. Thereupon the second device 30 is connected, however, first the distance b has to be eliminated. At that time the drive device 15 still has to be working in order to avoid a reversed rotation. However, as soon as the distance b is overcome, the spindle 16 is blocked due to the frictional connection, so that during the further process of generating the closing force, the blocking device merely is a pressure element integrated into the power flux. By this the bearings, especially also in the high pressure area of the mold closure, are loaded only with the force of the first resetting means 18 which are formed as spring washers. The spring washers are adjusted so strongly that when the movable mold carrier 11 is moved no blocking is possible. Blocking will only turn up after the second device 30 has been connected. The blocking device is preferably formed in such a way that sliding between blocking disc 17a and the bearing ring 19 is avoided. Until these two parts come in contact due to the operation of the second device 30 for generating the closing force, the drive device 15 is run, so that the two parts come in contact while they are non-operative, this means when the blocking disc 17a rests and then come in touch frictionally or form-fit. Since the closing force is only generated when the spindles 16 have completely stopped operating, the spindles can be dimensioned correspondingly smaller or in case larger spindles are used, a correspondingly longer life is achieved, since the dynamic stress is lower. The dynamic stress directly influences the total life of the spindle system.

The whole mold closing unit is largely mounted symmetrically with respect to a vertical center plane. The drive motor 15 is also placed in this plane. The two pulleys of the first device 10 are arranged staggered against one another in closing direction s—s as can be seen from FIGS. 2 and 7. Another advantage of such a symmetrical arrangement is, especially in case two spindles 16 are applied, that an ejection unit can be provided between the two spindles 16, if necessary. The stationary mold carrier 12 is additionally provided with an opening orifice 12a, through which an injection unit can be approached to the mold cavity of the mold 33.

The second device 30 for generating the closing force also permits a control of the closing force. This way it is possible on the one hand to join the two mold parts (in FIG. 1 the mold closure is represented by the dotted lines; the split dimension C=0) and to actuate the second device 30 by a determined dimension, so that a certain desired and presettable closing force can be generated. This arrangement is of special advantage, if the molds 33 in the machine are not or should not be pressurized with the full power of the mold closing unit.

On the other hand it is also possible to realize transfer molding for example by approaching the two mold parts until a determined split dimension c is reached and then transfer the mold closing unit into its final position by the second device 30. By this it is also possible to limit the maximum closing force to be generated with respect to the upper value.

The control requires different auxiliary means for determination of the regulation parameters. For this purpose it is for example possible to provide a motor with an absolute distance measuring system for determination of the position of the movable mold carrier 12. If a motor without incremental distance measuring is used, additional separate linear potentiometers 65, mounted parallely with respect to the spindle axis, are applied, which securely detect and indicate the actual position of the movable mold carrier 11. It is also possible to readjust the correct closing force by force measuring studs in form of force sensors 61 arranged in spars. However, the force measuring studs or load cells can be arranged at any place one likes that lies within the power flux, for example if an eccentric drive E is used, within the hinge bolt 39 as force sensor 64.

The splitting of movements during mold closure into a movement of the movable mold carrier 11, generated by the first device 10, at least nearly into a closing position and in a movement for generating the closing force via the second device 30 allows the measuring systems to be adapted, as for example force sensing means according to their specific function. Since the first device 10 is not involved in the power flux during mold closure, this first device may be provided with a sensitive, highly resolving sensor within the direct power flux. Such a force sensor 63 for sensing the force Fs, occurring especially in moving the movable mold carrier 11, should preferably be arranged between first supporting element 13 and the first device, and most preferably in the vicinity of the axis 16a of spindle 16. This arrangement separates in removing the distance b also the force sensor 63 as first force sensing means from the power flux. The force occurring in moving the movable mold carrier 11 may now be sensed so exactly, that even the smallest disturbances can be detected, thereby increasing the life of the whole mold closing unit.

Furthermore, in connection with the second device 30 second force sensing means can be provided for sensing at least the forces occurring when the mold 33 is closed. At least one of such second force sensing means can be arranged in the power flux, for example at the hinge bolt 39, where the second device 30 is jointed, as force sensor 64 and/or at the force transmitting means 25 as force sensor 61 in the form of a force measuring stud and/or as force sensor 62 at the bearing of the nut 14.

Figure 5:
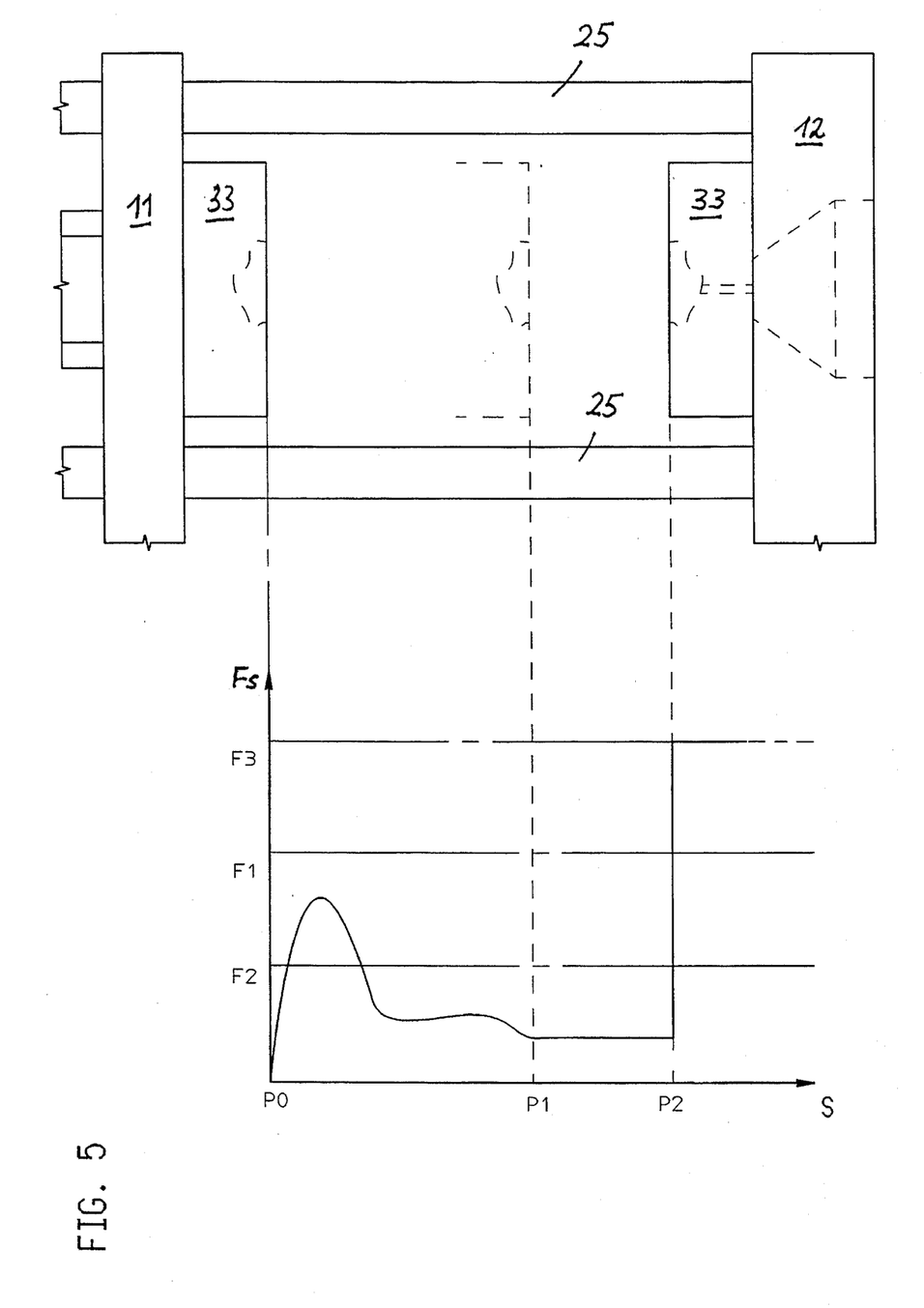
FIG. 5 is a schematic diagram indicating the actual force Fs necessary for moving the movable mold carrier until a touch force is generated via a first device.

A mold closing unit so equipped may be used according to FIGS. 5 to 10 as follows. FIG. 5 illustrates the force occurring when the mold is closed by the first device 10. The really necessary actual force Fs is measured by the force sensor 63 in moving the movable mold carrier 11 into the closing position. Starting at a start position PO, initially the actual force increases as the mold carried 11 is moved in the direction s. This force increase is necessary to start a movement of the mass of the movable mold carrier 11 and to overcome friction forces in the very beginning. During the movement, the actual force Fs decreases to the slide friction force. Shortly before the closing position P2, a mold protecting phase is reached, starting at a mold protection position P1. In this mold protection phase, the movable mold carrier 11 is normally moved with less velocity and less force than before to avoid damaging the mold 33.

As soon as the closing position is reached and the parts of the mold 33 are in contact, the first device generates a predetermined touch contact force F3, i.e., a mold securing phase is generated. Basically, the first device is adapted not to generate a higher force than this touch force, which can be managed, for example, by adjusting the first resetting means 18.

The force sensor 63 integrated in the power flux of the first device 10 enables a control, preferably in a closed loop, of the force occurring in moving the movable mold carrier 11. A sensitive, highly resolving sensor allows a very exact sensing of the mold securing or mold protecting force. This is a basic requirement in generating the predetermined touch force, based on which an exact partial force F4 can be generated by the second device 30. Thereby an open loop control of the maximum closing force F5 is available. Hence, the maximum closing force F5 can be repeated from cycle to cycle and can compensate any kind of warmth extension.

Figure 6:
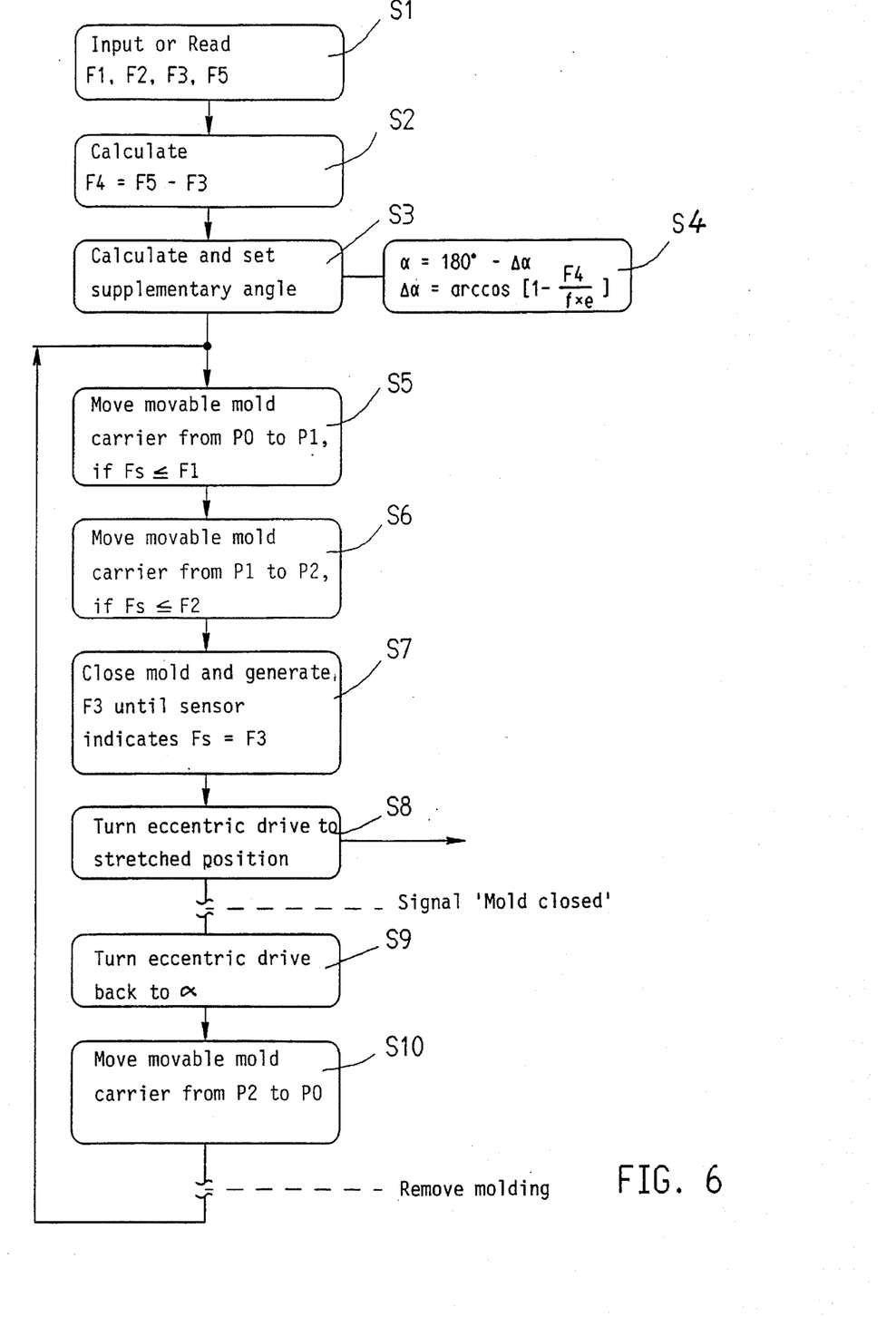
FIG. 6 is a schematic diagram indicating the process including force control in moving the movable mold carrier and force control in generating a closing force.

FIG. 6 illustrates the steps of the process during closed loop control in moving the movable mold carrier 11 and in generating the touch force, and during open loop control in generating the maximum closing force F5. As an example, the process will be explained at a mold closing unit comprising an eccentric drive E. In this case, the smallest changes in the angle of the eccentric drive E help to realize a mold closing force control in the easiest way. In a first step S1, the following parameters were set, i.e., either inputted or read out of a data processing unit:

a first maximum force F1 limiting the actual force Fs occurring in moving the movable mold carrier 11 from the start position PO into the closing position P2, a mold protecting force F2 limiting the actual force Fs in the mold protecting phase a touch force F3 to be generated by the first device 10 when the at least two parts of the molds are in the closing position P2, a desired maximum mold closing force F5

Figure 8:
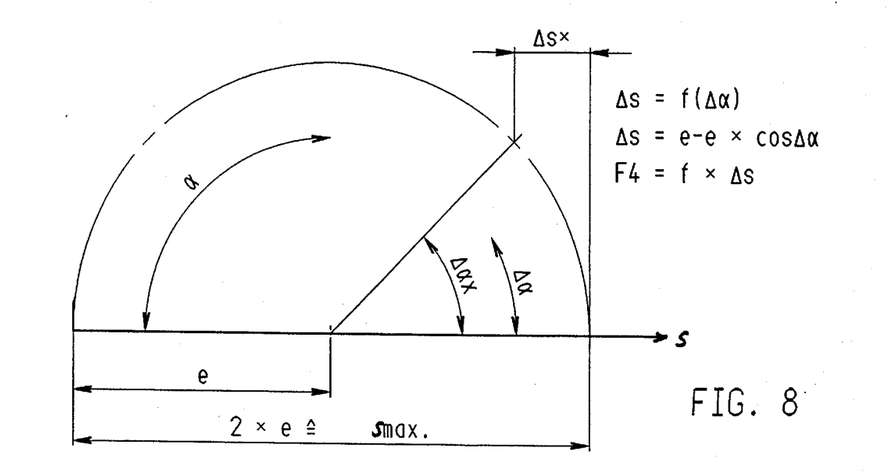
FIG. 8 is a diagram illustrating the relationship between supplementary angle $\alpha$, remainder angle $\Delta\alpha$ and way s necessary to generate the force.

In subtracting the touch force F3 from the maximum closing force F5, the partial force F4 to be generated by the second device 30 is calculated in step S2. However, even without this calculation the force control of the force occurring in moving the movable mold carrier may now be realized as illustrated in FIG. 8.

During the movement of the movable mold carrier, the actual force Fs is measured via force sensor 63, preferably all of the time. This actual force is then compared with the first maximum force F1 and mold closure is stopped, if the actual force Fs is higher than the first maximum force F1. Stopping refers to either a real stop or a reversed movement of the movable mold carrier 11, i.e. opening of the mold 33. This comparison is done between the start position P0 and at least the mold protection position P2. If necessary, this comparison may be continued until the closing position P2 is reached, when an extra mold protection phase is not established (step 5). Otherwise, as soon as the mold protection position P1 is reached and passed, it is continuously examined, whether or not the actual force Fs is smaller than the mold protecting force F2. The mold protecting force F2 is usually smaller than the first maximum force F1. Mold closure is stopped, if the actual force Fs is higher than the mold protecting force F2 (step S6). When the closing position is reached, the first device generates the touch force F3 (step S7).

The setting of the first maximum force F1 and the mold protecting force F2 is only one possibility, because these forces can be achieved on other ways also. For example, the course of forces can be measured and stored in a first cycle. Additionally, the machine control may fix a tolerance area around the measured values and may use these values for the control of further cycles. Or based on one or more former cycles a course may be set for further control.

To realize an open loop control of the mold closing force, after the closed loop control of the forces occurring until the touch force is generated, the supplementary angle α has to be calculated in step S3 and be set before the first mold closure cycle. The supplementary angle supplements the remainder angle Δα to 180 degree. This calculation is necessary, for it is desired to have the eccentric drive at its dead stop, i.e in its most stretched (extended) position if possible, when the desired maximum closing force F5 occurs. In this position, the eccentric drive E is nearly self holding and can therefore be driven in the most economic way. By that reason the supplementary angle is calculated, where the eccentric drive E starts turning to generate the partial force F4 after the touch force F3 is generated.

Figure 7:
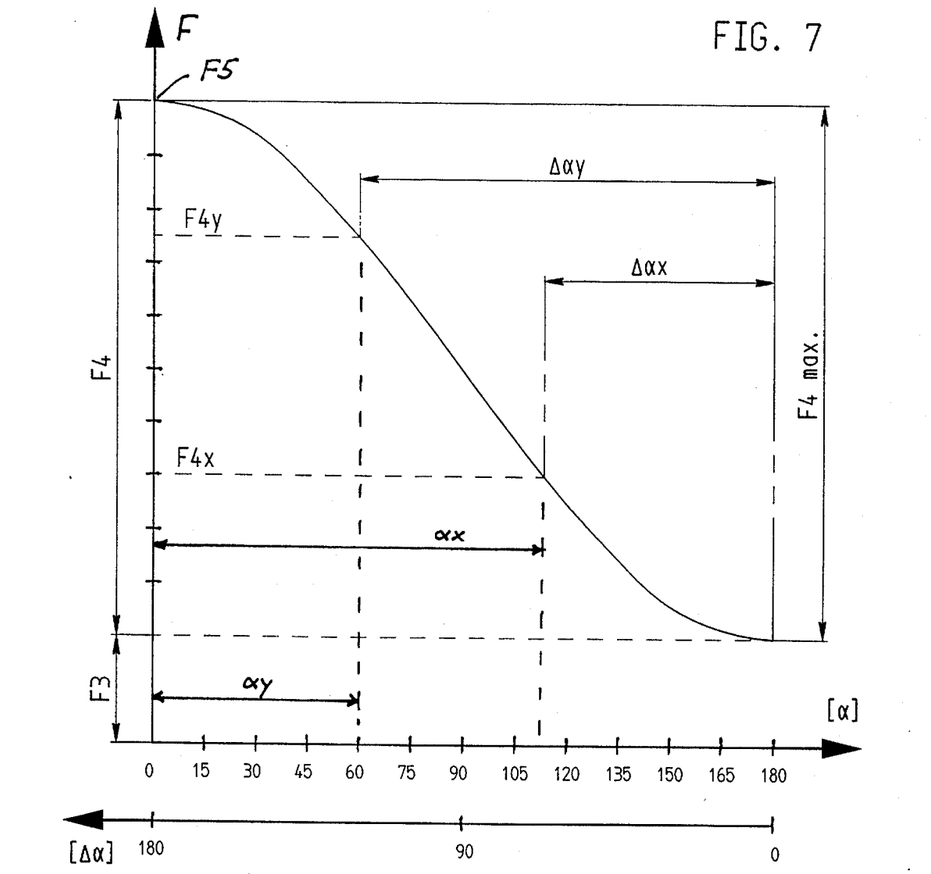
FIG. 7 is a schematic diagram indicating a maximum force to be generated by an eccentric drive corresponding to a supplementary angle $\alpha$ measured from a zero position of the eccentric drive.

FIG. 7 illustrates the relation between supplementary angle α and achievable maximum closing force F5. If the supplementary angle is set to zero, the maximum distance smax equals twice the eccentricity e available to generate the maximum partial force F4max via the second device 30. Because the first device was engaged beforehand, this determines also the maximum closing force as a sum of touch force F3 plus partial force F4 of the eccentric drive E. If the user desires a smaller maximum closing force F5, the partial force has to be reduced and the remainder angle Δα is smaller. At the same time the supplementary angle α as start angle of the eccentric drive is bigger and hence the distance Δs smaller. If, for example a partial force F4x or F4y is desired, this results according to the cosinus function in FIG. 7 in a supplementary angle αy or αx, respectively, which has to be set on beforehand in bringing the eccentric drive to the dead stop, when the closing force is generated. Hence, a remainder angle Δαy or Δαx will be left for generating this maximum closing force F5 as maximum desired value. As illustrated in FIG. 8 a certain supplementary angle αx leads to a certain Δsx according to the formula $$\Delta s = e - e \times \cos \alpha \Delta$$

when generating $$F4 = f \times \Delta s$$

Here Δs is the remaining amount of deformation necessary to generate the partial force F4, which can be calculated in multiplying the amount of deformation with the elasticity f of the whole system. The elasticity f of the mold closing unit may be determined, for example, when the injection molding machine is established the first time and may be stored in the machine control. The elasticity of the mold 33 is unknown. However, when the mold height is known, the elasticity may be determined under a simplified assumption of a standard mold. This leads to a formula for calculating the remainder angle Δα in step S4.

$$\Delta\alpha = \arccos(1 - F4/(f \times e))$$

The supplementary angle α to this remainder angle can now be adjusted.

After the closed loop force control in moving the movable mold carrier 11 has taken place and the touch force F3 is generated, the shaft 34 of the eccentric drive E is turned around the supplementary angle according to step S8 until the eccentric drive E is in its stretched position corresponding to a supplementary angle α=180°. Now, an usual molding cycle can begin. After the plastifiable material was injected and the mold was cooled, the eccentric drive E is not completely turned back. It is only turned back around the remainder angle (step S9). Hence, during the next cycle the same partial force F4 can be generated in turning the eccentric drive E around the same angle. Because in turning back around the remainder angle Δα again the touch force F3 is reproduced, the first device 10 will now be able to reduce the touch force F3 and open the mold for removing moldings (step 10). The next cycle can begin.

Figure 9:
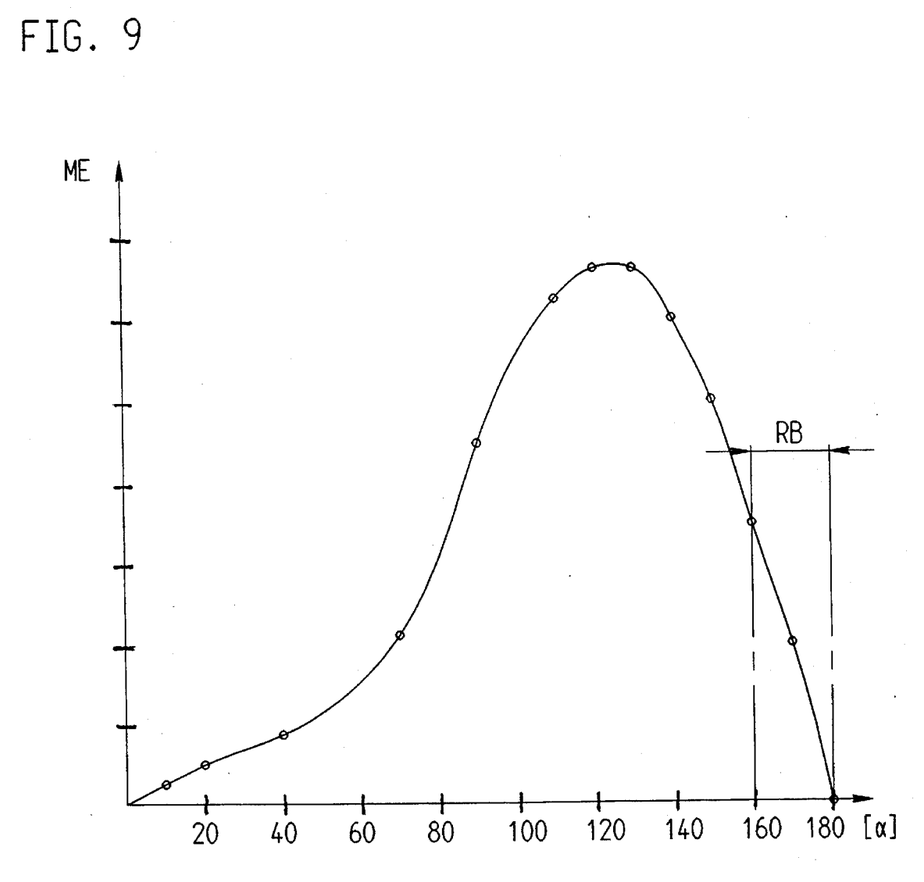
FIG. 9 is a diagram indicating the moment to be generated by the eccentric drive during control of the closing force corresponding to the supplementary angle.
Figure 10:
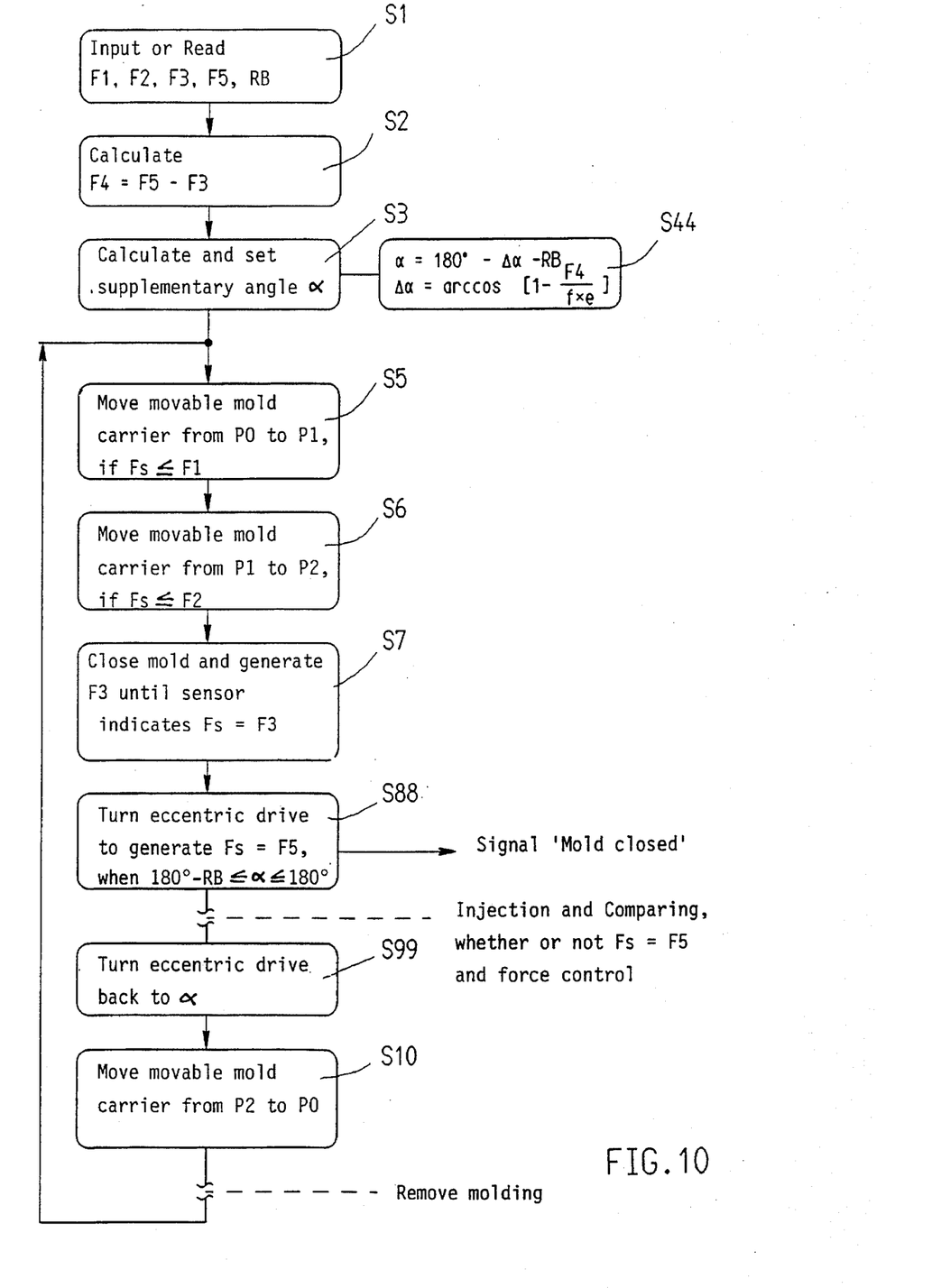
FIG. 10 is a schematic diagram similar to FIG. 9 including a closed loop force control.

In FIGS. 9 and 10 now in addition or alternatively a closed loop control of the mold closing force will be explained in detail. Hitherto the mold closing force could only be generated as fixed a predetermined value as soon as the mold was closed. Now the maximum mold closing force F5 can be controlled during mold closure and not only controlled for the next cycle when the actual cycle has gone. Here the force transmission of the eccentric drive E in a region before it reaches the dead stop in the stretched position is of advantage, for even small differences in the mold closing force can be controlled by relatively big changes in angle during injection and back pressure phase with only a little loss of energy. In FIG. 9 the eccentric moment generated by the eccentric drive is indicated in respect of the supplementary angle α. If a control area RB is introduced shortly before the dead point, this figure illustrates the possibilities of such a control. It is of advantage to keep the control area RB in a region where the eccentric moment is beyond 50% of the maximum eccentric moment ME, however, this corresponds to an admissible range of 20 degree. To reduce the loss of energy the control area should be kept small to enable at least a nearly stretched position of the eccentric drive E.

In FIG. 10 the same steps of such a process as in FIG 6 have the same reference characters. Hence, in respect to steps S1, S5, S6 and S7 (closed loop control in moving the movable mold carrier) the above explanations can be referred to. In a closed loop control of the maximum mold closing force F5 in step S1 additionally the control area has to be set. In step S2 the partial force is calculated as in FIG. 6. With the above formulas, an amount of deformation $\Delta s$ arising in generating the partial force F4 by the eccentric drive E after the touch force F3 was generated by the first device 10 is calculated and an amount corresponding to the control area RB is added. With this information, a remainder angle $\Delta\alpha$ necessary for generating the amount of deformation $\Delta s$ and the amount corresponding to the control area RB can be calculated when turning the eccentric drive E into the dead stop. In step S3, a supplementary angle amending the remainder angle $\Delta\alpha$ to 180 degree is determined and adjusted in driving the eccentric drive E to the supplementary angle $\alpha$ measured from a zero position, wherein the eccentric drive E has its smallest length.

In the following cycles the touch force F3 is generated via the first device 10 (step S7). Then the maximum closing force F5 is generated according to step S88 in turning the eccentric drive around a supplementary angle $\alpha$ of $$180° - RB \leq \alpha \leq 180°$$

If the desired maximum mold closing force F5 is generated, the control gets the signal 'Mold closed' and starts the known injection molding. During injection molding the actual force Fs is continuously sensed via the second force sensing means and compared with the desired maximum closing force F5 to determine a control parameter for the control of the eccentric drive E within the control area RB.

After each injection, the eccentric drive is turned back to the calculated supplementary angle according to step S99 and as mentioned before the mold is opened and the molding removed in step S10.

In this embodiment it is possible to control the forces occurring in moving the movable mold carrier 11 via the second force sensing means, the force sensors 61,62,64, although they are now within the power flux of the second device. But, because the mold closing force is controlled, an exact resolution of the touch force F3 is not required. Thus, a force sensor in the power flux of the first device is not really necessary.

Figure 1:
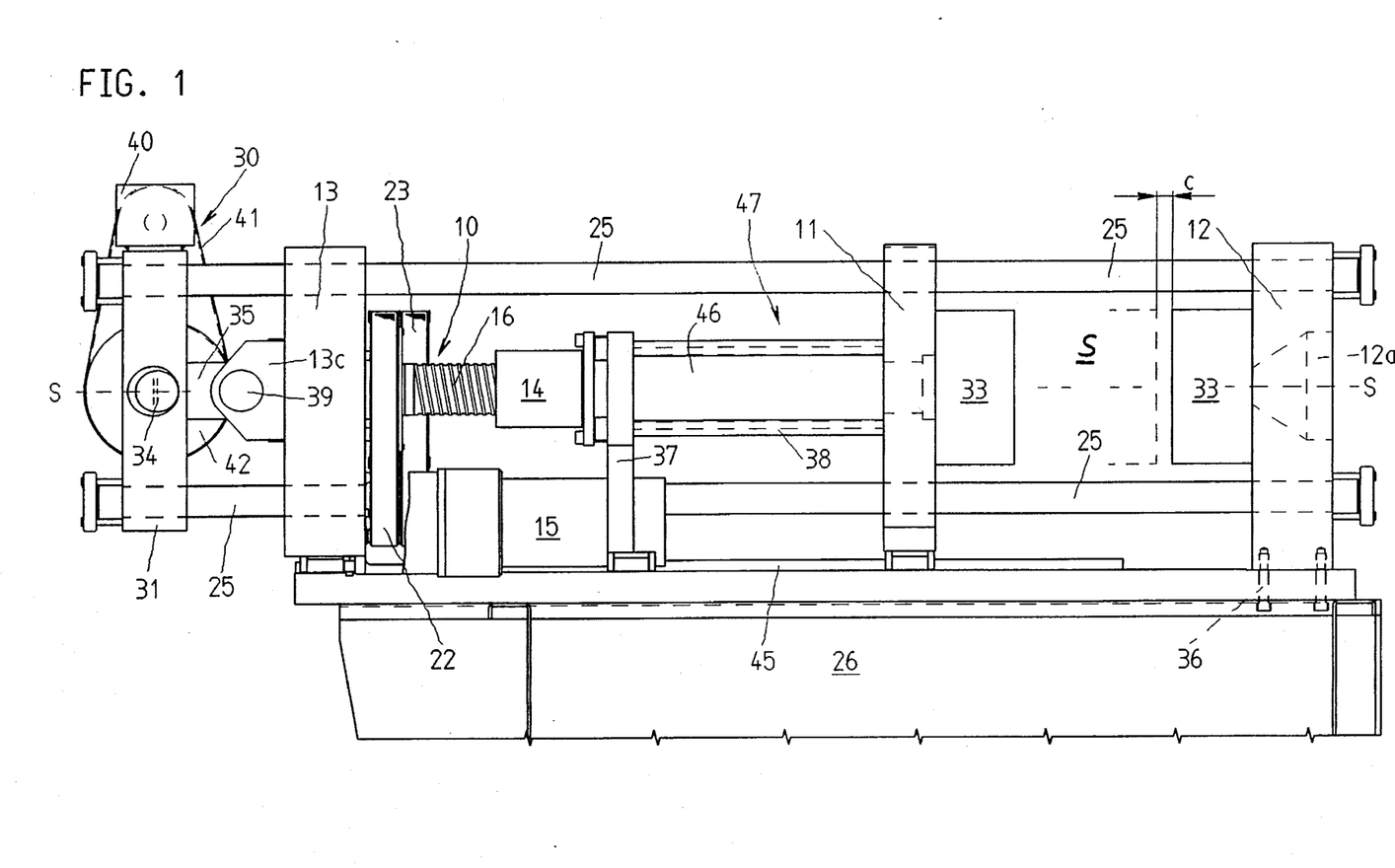
FIG. 1 is a side view of a mold closing unit provided with an electromechanically driven eccentric drive for generating the closing force.
Figure 2:
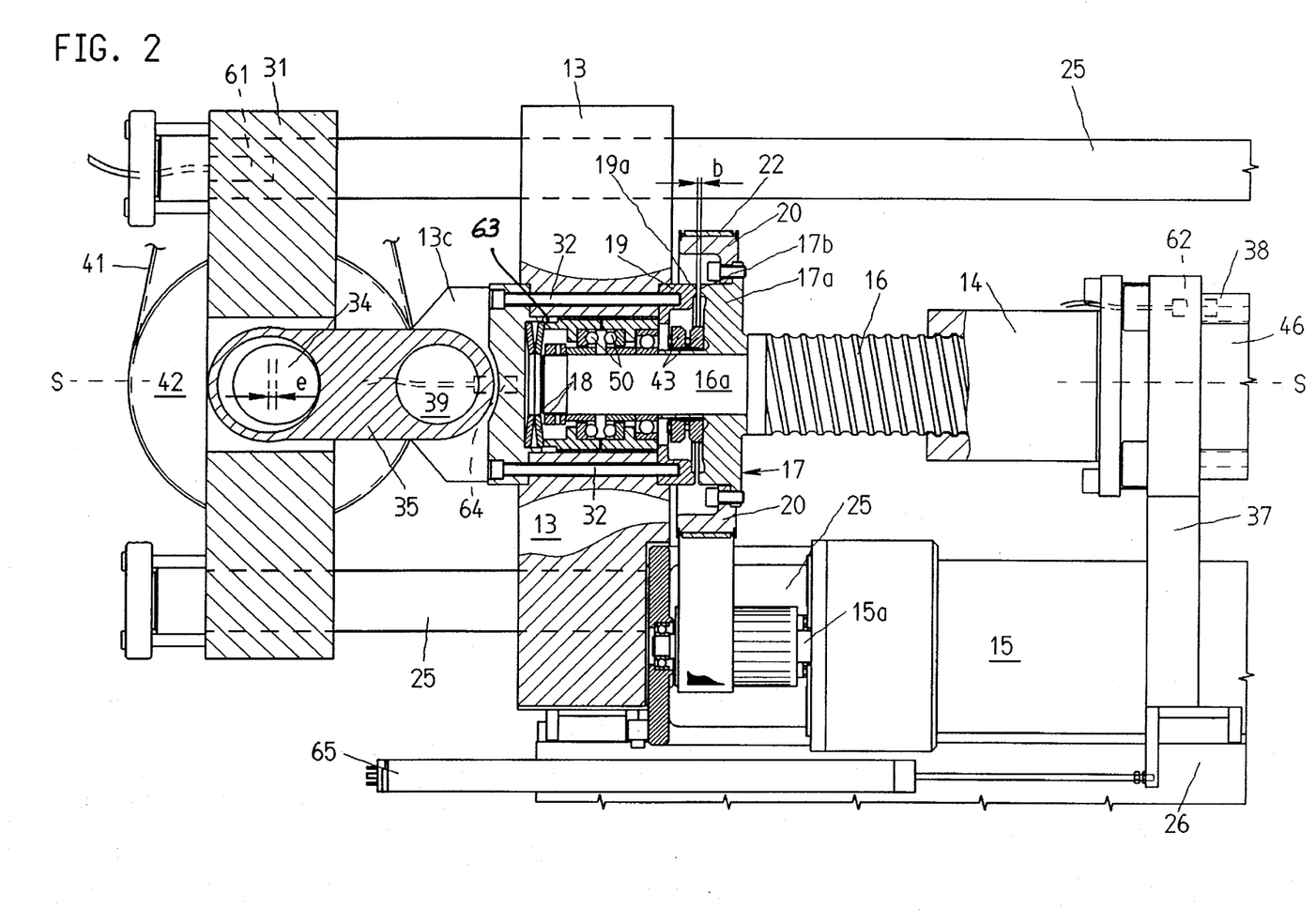
FIG. 2 is an enlarged, partial view from FIG. 1 in the area of the supporting elements.
Figure 3:
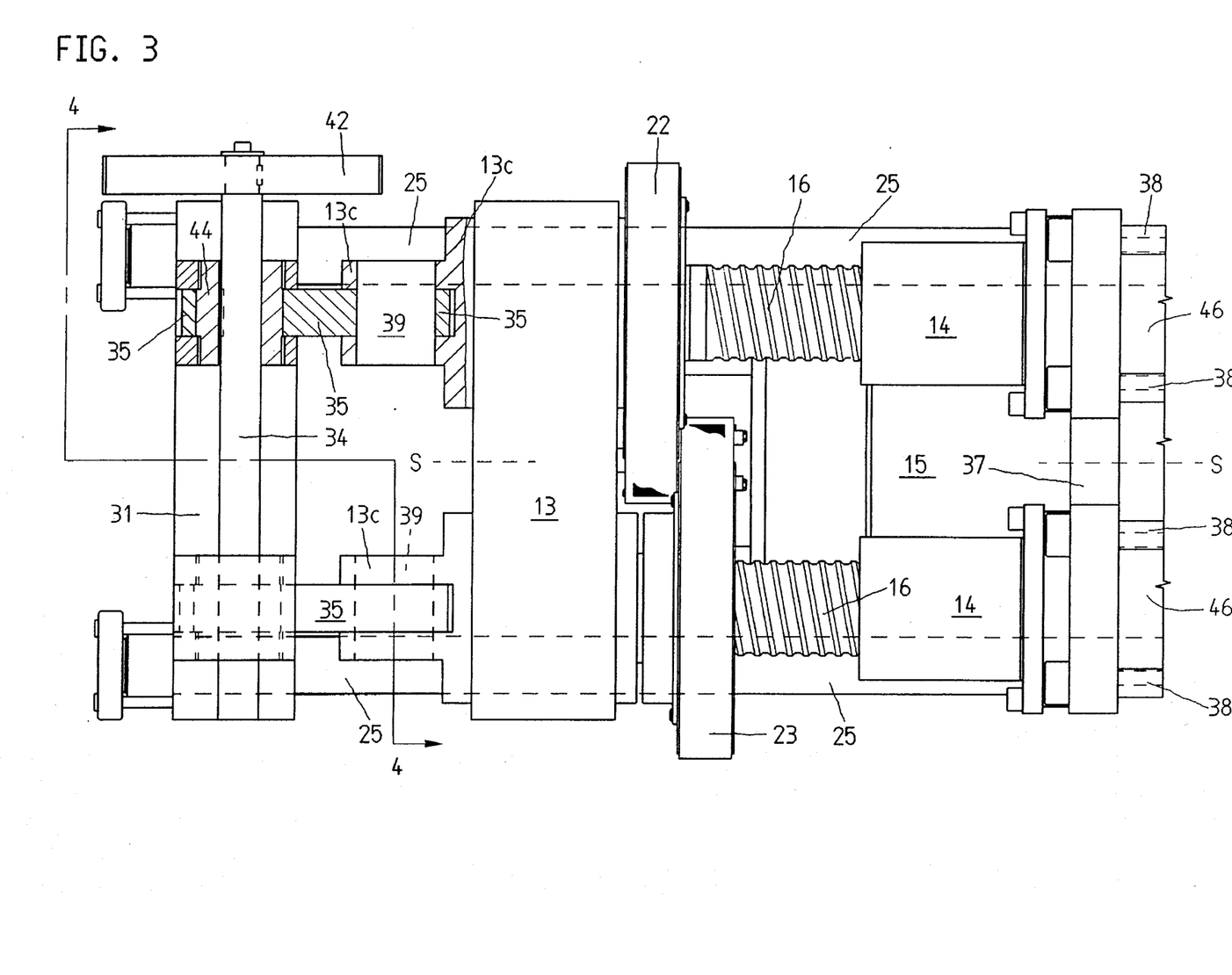
FIG. 3 is a partial top view of the mold closing unit in a representation according to FIG. 2.
Figure 4:
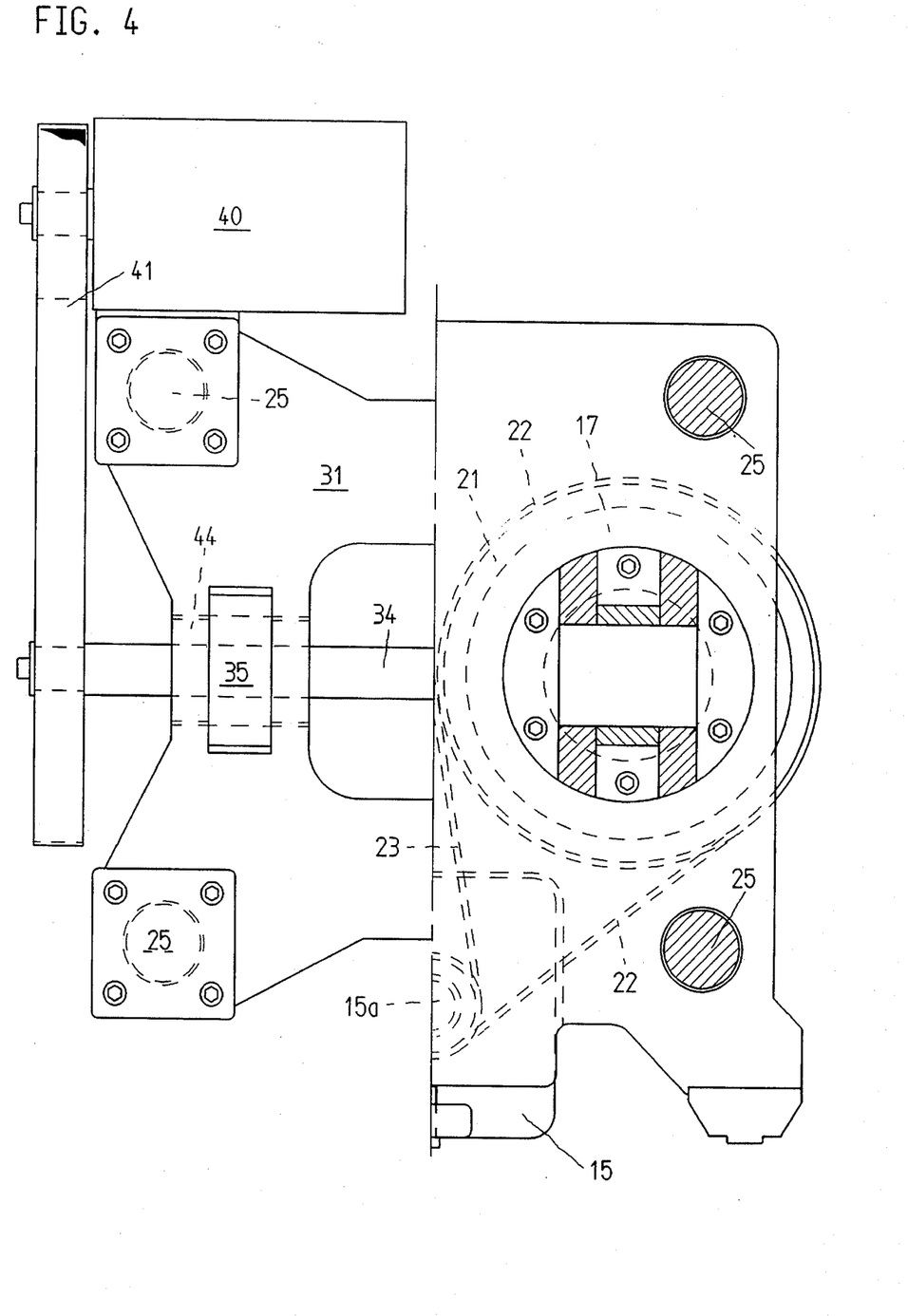
FIG. 4 is a section through the mold closing unit according to line 4—4 in FIG. 3.

To enable such a force control as explained before the second device 30, especially when an eccentric drive E is used, can be arranged behind the first supporting element 13 as illustrated in FIG. 2. However, it is also possible to arrange the second device at any other place, where it can generate the mold closing force. A further example for such an arrangement can be seen in U.S. patent application Ser. No. 08/313,871 of the applicant.

I claim:

1. A mold closing unit, comprising:

a stationary mold carrier;

a movable mold carrier forming with said stationary mold carrier a mold clamping space located therebetween;

a mold comprising at least two parts each being respectively mounted on said stationary mold carrier and said movable mold carrier;

first and second supporting elements;

a force transmitting device connecting said first and second supporting elements to said stationary mold carrier;

a transfer device supported by said first supporting element and being connected to said movable mold carrier for transferring said movable mold carrier at least nearly into and out of a closing position with said stationary mold carrier, the closing position being a position in which said at least two parts are essentially closed; and an eccentric drive supported by said second supporting element and connecting said second supporting element to said first supporting element, said eccentric drive having a shaft that exerts a closing force that is transmitted through said first supporting element, said transfer device, and said movable mold carrier, said eccentric drive being actuated to exert the closing force after said transfer device has transferred said movable mold carrier into the closing position.

2. The mold closing unit defined in claim 1, wherein said transfer device comprises at least one spindle, and blocking means connected to said spindle for blocking a reverse movement of said spindle when the closing force is exerted.

3. The mold closing unit defined in claim 2, wherein said spindle has a longitudinal axis about which said spindle is rotatable, and wherein said blocking means comprises a blocking disc located on the axis of said spindle, and resilient resetting means for exerting a predetermined force against said blocking disc; said blocking disc being movable counter to the predetermined force to connect said blocking disc with said first supporting element.

4. The mold closing unit defined in claim 3, wherein said blocking means comprises a bearing ring attached to said first supporting element, said bearing ring having an annular portion that projects toward said blocking disc, and wherein said blocking disc comprises an annular ring that projects in a direction essentially parallel to the axis and toward said bearing ring, said annular ring and said annular portion being frictionally engagable with one another for blocking the reverse movement of said spindle.

5. The mold closing unit defined in claim 4, wherein said annular ring and said annular portion are separated from one another by a distance when said movable mold carrier is in the closing position, and before the closing force is exerted, the distance being smaller than an eccentricity of said eccentric drive.

6. The mold closing unit defined in claim 1, wherein said transfer device comprises an electromotoric drive; further comprising a control device for serial control of said transfer device and said eccentric drive, and for controlling said electromotoric drive during a mold securing phase of said mold carriers, said control device comprising at least one force sensing means located between said first supporting element and said transfer device for sensing a force occurring during a movement of said movable mold carrier.

* * * * *